(12) United States Patent
Fan et al.

(10) Patent No.: US 11,953,235 B1
(45) Date of Patent: Apr. 9, 2024

(54) LOW-HEAT-LOSS OPERATION METHOD OF LINE-FOCUSING HEAT COLLECTION SYSTEM AND LINE-FOCUSING HEAT COLLECTION SYSTEM

(71) Applicants: Lanzhou Dacheng Technology Co., Ltd., Lanzhou (CN); Dunhuang Dacheng Shengneng Technology Co., Ltd., Gansu (CN)

(72) Inventors: Duowang Fan, Lanzhou (CN); Duojin Fan, Lanzhou (CN); Linggang Kong, Lanzhou (CN); Wenye Qi, Lanzhou (CN); Yulei Fan, Lanzhou (CN); Xiaoming Yao, Lanzhou (CN); Zhiyong Zhang, Lanzhou (CN); Bo Li, Lanzhou (CN); Fujun Zhao, Lanzhou (CN); Zhilin Liu, Lanzhou (CN); Guodong Wang, Lanzhou (CN); Wen Li, Lanzhou (CN); Chongchong Zhang, Lanzhou (CN)

(73) Assignees: Lanzhou Dacheng Technology Co., Ltd. (CN); Dunhuang Dacheng Shengneng Technology Co., Ltd. (CN)

( * ) Notice: Subject to any disclaimer, the term of this patent is extended or adjusted under 35 U.S.C. 154(b) by 0 days.

(21) Appl. No.: 18/240,730

(22) Filed: Aug. 31, 2023

(30) Foreign Application Priority Data

Nov. 21, 2022 (CN) .......................... 202211453348.7

(51) Int. Cl.
*F24S 40/60* (2018.01)
*F24S 50/00* (2018.01)

(52) U.S. Cl.
CPC ............... *F24S 40/60* (2018.05); *F24S 50/00* (2018.05)

(58) Field of Classification Search
CPC ................................. F24S 40/60; F24S 50/00
See application file for complete search history.

(56) References Cited

U.S. PATENT DOCUMENTS 4,237,862 A * 12/1980 Embree ................... F24S 40/60
126/588
4,337,757 A * 7/1982 Newton ................... F24S 40/60
126/588

(Continued)

FOREIGN PATENT DOCUMENTS

| CN | 102563867 A | 7/2012 |
| CN | 210179929 U | 3/2020 |
| CN | 115654753 B | 5/2023 |

OTHER PUBLICATIONS

Notification to Grant Patent Right for Invention for Chinese Application No. 202211453348.7 dated Apr. 13, 2023. 1 pg.

(Continued)

*Primary Examiner* — Alfred Basichas
(74) *Attorney, Agent, or Firm* — Lerner David LLP

(57) ABSTRACT

A low-heat-loss operation method of a line-focusing heat collection system and the line-focusing heat collection system are provided. The method includes the following steps. Solar energy is utilized to preheat a collector tube in an empty tube state, so that the collector tube is in a preheating mode. After a set preheating temperature is reached, a heat transfer working medium is injected into the collector tube. In the injection process of the heat transfer working medium, an injection section of the collector tube is converted into a focusing mode from a preheating mode. After heat collection is finished, the circulation of the heat transfer working medium is stopped, and the focusing mode of the collector tube is kept. In the drainage process of the heat transfer (Continued)

working medium, an emptying section of the collector tube is converted into a light heat-tracing mode from a focusing mode.

15 Claims, 8 Drawing Sheets

(56) References Cited

U.S. PATENT DOCUMENTS

| | | | |
|---|---|---|---|
| 9,874,376 B2* | 1/2018 | Teoh | F24S 90/10 |
| 2003/0024686 A1* | 2/2003 | Ouellette | F28D 15/0275 |
| | | | 165/47 |
| 2009/0173335 A1* | 7/2009 | Wanag | F24S 40/20 |
| | | | 126/570 |
| 2012/0090597 A1* | 4/2012 | Roetker | F24S 40/60 |
| | | | 126/646 |
| 2013/0118477 A1* | 5/2013 | Albrecht | F22B 21/04 |
| | | | 126/609 |
| 2015/0075657 A1* | 3/2015 | Edwards | F03G 7/05 |
| | | | 137/613 |
| 2017/0102192 A1* | 4/2017 | Olsen | F28D 20/021 |
| 2019/0056148 A1* | 2/2019 | Shinozaki | F22B 1/006 |

OTHER PUBLICATIONS

First Office Action for Chinese Application No. 202211453348.7 dated Mar. 1, 2023. 3 pgs.

* cited by examiner

```
┌─────────────────────────────────────────────────────────┐
│ Before the heat transfer working medium is injected,    │── Step 100
│ preheat the collector tubes in an empty tube state by   │
│ utilizing solar energy                                  │
└─────────────────────────────────────────────────────────┘
                            │
                            ▼
┌─────────────────────────────────────────────────────────┐
│ After the collector tube reaches a set preheating       │
│ temperature, switch on the circulating pump to inject   │── Step 110
│ the heat transfer working medium into the collector     │
│ tube and start circulation of the heat transfer working │
│ medium, and convert the heat collection device into the │
│ focusing mode from the preheating mode                  │
└─────────────────────────────────────────────────────────┘
                            │
                            ▼
┌─────────────────────────────────────────────────────────┐
│ When the heat transfer working medium is drained at the │
│ end of heat collection, switch off the circulating pump │── Step 120
│ in the line-focusing heat collection system to stop the │
│ circulation of the heat transfer working medium in the  │
│ system, and enable the original heat collection device  │
│ to still keep the heat collection state for the         │
│ collector tube                                          │
└─────────────────────────────────────────────────────────┘
                            │
                            ▼
┌─────────────────────────────────────────────────────────┐
│ Open the drainage valve, and drain the heat transfer    │
│ working medium into a storage tank from the collector   │── Step 130
│ tube; and when the heat transfer working medium is      │
│ drained, convert an emptying section of each of the     │
│ collector tubes into a light heat-tracing mode from the │
│ focusing mode                                           │
└─────────────────────────────────────────────────────────┘
                            │
                            ▼
┌─────────────────────────────────────────────────────────┐
│ After the heat transfer working medium in the collector │
│ tube is emptied, enable no heat transfer working medium │── Step 140
│ to be in the collector tube, and stop the light         │
│ heat-tracing mode of the collector tube                 │
└─────────────────────────────────────────────────────────┘
```

FIG. 8

LOW-HEAT-LOSS OPERATION METHOD OF LINE-FOCUSING HEAT COLLECTION SYSTEM AND LINE-FOCUSING HEAT COLLECTION SYSTEM

CROSS-REFERENCE TO RELATED APPLICATION

This patent application claims the benefit and priority of Chinese Patent Application No. 202211453348.7 filed with the China National Intellectual Property Administration on Nov. 21, 2022, the disclosure of which is incorporated by reference herein in its entirety as part of the present application.

TECHNICAL FIELD

The present disclosure relates to the technical field of solar-thermal systems, in particular to a low-heat-loss operation method of a line-focusing heat collection system and the line-focusing heat collection system.

BACKGROUND

Solar photothermal power generation has the advantages of high energy conversion efficiency, low energy consumption in manufacturing process, clean and pollution-free in using process, large-scale heat storage and the like. According to the basic principle of solar photothermal power generation, solar radiation energy is converged into a heat collection system with large-scale mirrors. Heat transfer working mediums such as water, heat transfer oil or fused salt in the heat collection device are heated, so that solar radiation energy with low energy flow density is converged into heat energy with high energy flow density.

According to the focusing form of the collector field, the current mainstream focusing solar photothermal power generation includes a trough type technical route, a tower type technical route, a linear Fresnel type technical route and a butterfly type technical route. The trough type technical route and the linear Fresnel type technical route are in line-focusing heat collection modes. The line-focusing heat collection field has both a long pipeline and a large heat loss of the heat transfer working medium. In the traditional operation mode, the heat transfer working medium is usually heated and injected into the heat collection system at one time, or the heat transfer working medium is injected into the heat collection pipeline at one time after the heat collection pipeline is heated by means of electrical impedance heating. After that, except for the troubleshooting of the heat collection system, the heat transfer working medium stays in the circulation pipeline all the time, and the solidifying point of the heat transfer oil and fused salt is high. When the collector field is in a non-heat collection state, the heat transfer working medium needs low-speed circulation to prevent freezing blockage. The so-called low-speed circulation means that the collector field cannot get energy from the sun to heat the heat transfer working medium in the collector tube on cloudy days or from sunset to sunrise the next day, and the small-flow continuous circulation is adopted to keep the heat transfer working medium in the pipeline in a flowing state, thereby preventing the heat transfer working medium from being frozen in the circulating pipeline or collector tube. The heat transfer working medium is pumped out from the low-temperature storage tank, and heated by a natural gas/electric heating furnace to supplement energy to raise the temperature of the heat transfer working medium. And, the heat transfer working medium continuously flows in the circulating pipeline with a small flow rate. By adjusting the flow rate of the heat transfer working medium, it is ensured that the heat transfer working medium can flow back to the low-temperature storage tank at a safe temperature after the circulating pipeline is cooling. The energy loss of the heat transfer working medium during small-flow circulation at night or on cloudy days is mainly supplemented by natural gas and electric heating, and the circulating pump also needs to consume much energy.

In existing patent documents, there is a scheme of setting a salt drainage system or a scheme of heating and preheating after the heat transfer working medium is injected, but the related content of low heat loss operation are not systematically expounded. For example, Chinese Patent No. CN210179929U discloses a layout structure of a salt drainage system for a solar thermal power station. In this scheme, a salt drainage pump is taken as the power of a salt drainage process. If the fused salt temperature is low, the fused salt is difficult to be transported by the salt drainage pump. It is necessary to adopt additional electric heat-tracing methods, resulting in the reduction of salt drainage efficiency and the increase of salt drainage cost. Another example is Chinese Patent Application Publication No. CN102563867A, disclosed is a solar-assisted fused salt heating system. In this scheme, a heating pipe for assisted heating fused salt system and a preheating device for preheating the heating pipe are provided without disclosing a preheating scheme when the heat transfer working medium is injected.

SUMMARY

The purpose of the present disclosure is to provide a low-heat-loss operation method of a line-focusing heat collection system and the line-focusing heat collection system so as to solve the problems in the prior art. With different heating modes of a heat transfer working medium in different stages of injection, heat collection and drainage, solar energy can be effectively utilized to assist in achieving daily operation of both injection and discharge of the heat transfer working medium. In this way, the risk that the heat transfer working medium is frozen and blocked in a non-heat-collection state is avoided, and heat loss consumption generated by low-speed circulation condensation prevention and derived circulation power consumption are reduced.

In order to achieve the purpose, the present disclosure provides the following solution.

The present disclosure provides a low-heat-loss operation method of a line-focusing heat collection system, including the following steps: preheating collector tubes in an empty tube state by utilizing solar energy to enable the collector tubes to be in a preheating mode; after a set preheating temperature of each of the collector tubes is reached, injecting a heat transfer working medium into the collector tubes and starting a circulation of the heat transfer working medium, and when the heat transfer working medium is injected into the collector tubes, converting an injection section of each of the collector tubes into a focusing mode from the preheating mode; after heat collection of the collector tubes is finished, stopping the circulation of the heat transfer working medium, and keeping the focusing mode of the collector tubes; draining the heat transfer working medium into a storage tank through the collector tubes, and when the heat transfer working medium is drained, converting an emptying section of each of the collector tubes into a light heat-tracing mode from the focusing mode; and after the heat transfer working medium is emptied, stopping the light heat-tracing mode.

Preferably, preheating the collector tubes includes supplying compressed gas into the collector tubes to homogenize tube wall temperatures of the collector tubes by the compressed gas, and turning off the compressed gas after the set preheating temperature is reached.

Preferably, distributing multiple temperature measuring points on each of the collector tubes along a length direction thereof, and judging a injection state and a drainage state of the collector tube according to monitoring results of the plurality of temperature measuring points.

Preferably, adjusting a supply pressure and a supply frequency of the compressed gas according to temperature values of the plurality of temperature measuring points, wherein the temperature value is proportional to the supply pressure and the supply frequency of the compressed gas.

Preferably, the preheating mode includes a preheating preparation state, a focusing state and a defocusing state, and the line-focusing heat collection system is controlled to adopt a quick preheating mode or a slow preheating mode at different heat collection power by adjusting a time proportion of the focusing state to the defocusing state.

Preferably, the light heat-tracing mode includes a focusing state and a defocusing state, and a temperature of each of the collector tubes in the light heat-tracing mode is controlled by adjusting the time proportion of the focusing state to the defocusing state.

Preferably, when the heat transfer working medium is drained, the heat transfer working medium is drained to the storage tank by own weight of the heat transfer working medium and/or a power of the compressed gas.

The present disclosure also provides a line-focusing heat collection system, including collector tubes, a low-temperature tank and a high-temperature tank which respectively communicates with a heat collection inlet and a heat collection outlet of each of the collector tubes, and a heat transfer working medium which is flowed circularly, wherein one drainage tank communicates with the heat collection outlet of each of the collector tubes, each of the collector tubes is matched with multiple tracing mechanisms, each of the plurality of the tracing mechanisms is corresponding to one section of the collector tube, an injection section of the collector tube is converted into a focusing mode from a preheating mode by controlling a corresponding one of the plurality of the tracing mechanisms when the heat transfer working medium is injected, and an emptying section of the collector tube is converted into a light heat-tracing mode from a focusing mode by controlling a corresponding one of the plurality of the tracing mechanisms when the heat transfer working medium is drained.

Preferably, the heat collection inlet communicates with a compressed gas source for supplying compressed gas to the collector tube.

Preferably, the line-focusing heat collection system further including mirrors, wherein each of the mirrors is controlled by a corresponding one of the plurality of the tracing mechanisms, and the collector tube is controlled to be in a preheating preparation state, a focusing state or a defocusing state in response to whether the mirrors focusing solar rays on the collector tube.

Compared with the prior art, the present disclosure has the following technical effects.

Firstly, in the injection process of the heat transfer working medium, the injection section of each collector tube is converted into the focusing mode from the preheating mode. In the drainage process of the heat transfer working medium, the emptying section of each collector tube is converted into the light heat-tracing mode from the focusing mode. That is, with different heating modes of the heat transfer working medium in different stages of injection, heat collection and drainage, solar energy can be effectively utilized to assist in achieving daily operation of both injection and discharge of the heat transfer working medium. In this way, the risk that the heat transfer working medium is frozen and blocked in a non-heat-collection state is avoided, and heat loss consumption generated by low-speed circulation condensation prevention and derived circulation power consumption are reduced.

Secondly, when each collector tube is preheated, compressed gas is supplied into the collector tube, the tube wall temperature of the collector tube is homogenized by the compressed gas. So, the problems of bending deformation and freezing blockage of the collector tube caused by uneven temperature in the collector tube can be avoided.

Thirdly, when the heat transfer working medium is injected into the heat collection system, each collector tube in the heat collection system is heated by solar energy instead of heating the heat transfer working medium or the collector tube by fuel or electricity, so that the energy consumption is saved. When the heat transfer working medium is discharged from the heat collection system, solar energy is utilized to trace the heat of the collector tube, so that the risk of freezing blockage of the heat transfer working medium in the collector tube can be reduced. Salt drainage is promoted by the compressed air, so that the drainage speed of the heat transfer working medium can be improved, and the residual quantity of the heat transfer working medium in the collector tube can be reduced.

Fourthly, multiple temperature measuring points are distributed on each collector tube along the length direction thereof, the temperature change of each part of the collector tube is monitored through a corresponding temperature measuring point, and the position of the heat transfer working medium in the collector tube can be judged according to the monitoring results, so that a basis is provided for the change of the heat collection state.

Fifthly, the preheating mode includes a preheating preparation state, a focusing state and a defocusing state. By adjusting the time proportion of the focusing state to the defocusing state, the line-focusing heat collection system is controlled to adopt different preheating modes at different heat collection powers and to heat up according to the set temperature rise rate, so that each collector tube can be heated to the set temperature point at the controlled temperature rise rate, and the heat transfer working medium is safely injected. The light heat-tracing mode includes a focusing state and a defocusing state. The temperature of the collector tube in the light heat-tracing mode can be controlled by adjusting the time proportion of the focusing state to the defocusing state, so that the collector tube can always be in an appropriate temperature range, and the collector tube cannot be damaged due to too high temperature, and the heat transfer working medium cannot be solidified due to too low temperature, thus finally ensuring that the heat transfer working medium is drained cleanly and thoroughly.

Sixthly, when the heat transfer working medium is injected into each collector tube, the injection section of the collector tube is converted into the focusing mode from the preheating mode according to the position of the heat transfer working medium in the collector tube. On one hand, the injected heat transfer working medium can be heated in time to avoid the waste of light energy. On the other hand, the collector tube can be prevented from being damaged by continuous high-temperature heating in the focusing mode, and the collector tube can also be prevented from being bent and deformed due to uneven heating. In the drainage process of the heat transfer working medium, the light heat-tracing mode is continuously adopted for the emptying section, so that the solidification of the heat transfer working medium in the collector tube can be avoided. Thus, the obstruction to the drainage process can be avoided, the drainage efficiency of the heat transfer working medium is improved, and the energy consumption is reduced.

BRIEF DESCRIPTION OF THE DRAWINGS

To more clearly illustrate the present embodiment of the present disclosure or the technical solution in the prior art, the following briefly introduces the attached figures to be used in the present embodiment. Apparently, the attached figures in the following description show merely some embodiments of the present disclosure, and those skilled in the art may still derive other figures from these attached figures without creative efforts.

FIG. 8 is a schematic flowchart of a low-heat-loss operation method of a line-focusing heat collection system according to some embodiments of the present disclosure.

REFERENCE SIGNS 1 low-temperature tank; 2 circulating pump; 3 cold working medium common tube; 4 pressure measuring point; 5 heat collection inlet valve; 6 compressed gas source; 7 compressed gas valve; 8 collector tube; 9 heat collection device; 91 primary mirror; 911 primary mirror surface; 912 glue point; 913 support box; 92 secondary mirror; 921 secondary mirror surface; 922 support frame; 93 solar ray; 10 temperature measuring point; 11 hot working medium common tube; 12 first return valve; 13 second return valve; 14 high-temperature tank; 15 drainage valve; 16 drainage tank; 17 drainage pump; and 18 drainage pipeline.

DETAILED DESCRIPTION OF THE EMBODIMENTS

The following clearly and completely describes the technical solution in embodiments of the present disclosure with reference to the attached figures in embodiments of the present disclosure. Apparently, the described embodiments are merely a part rather than all of the embodiments of the present disclosure. Based on the embodiments in the present disclosure, all other embodiments obtained by those skilled in the art without contributing creative labor belong to the scope protected by the present disclosure.

The purpose of the present disclosure is to provide a low-heat-loss operation method of a line-focusing heat collection system and the line-focusing heat collection system so as to solve the problems in the prior art. With different heating modes of a heat transfer working medium in different stages of injection, heat collection and drainage, solar energy can be effectively utilized to assist in achieving daily operation of injection and discharge of the heat transfer working medium. In this way, the risk that the heat transfer working medium is frozen and blocked in a non-heat-collection state is avoided, and heat loss consumption generated by low-speed circulation condensation prevention and derived circulation power consumption are reduced.

To make the foregoing objective, features and advantages of the present disclosure clearer and more comprehensible, the present disclosure is further described in detail below with reference to the attached figures and specific embodiments.

Figure 1:
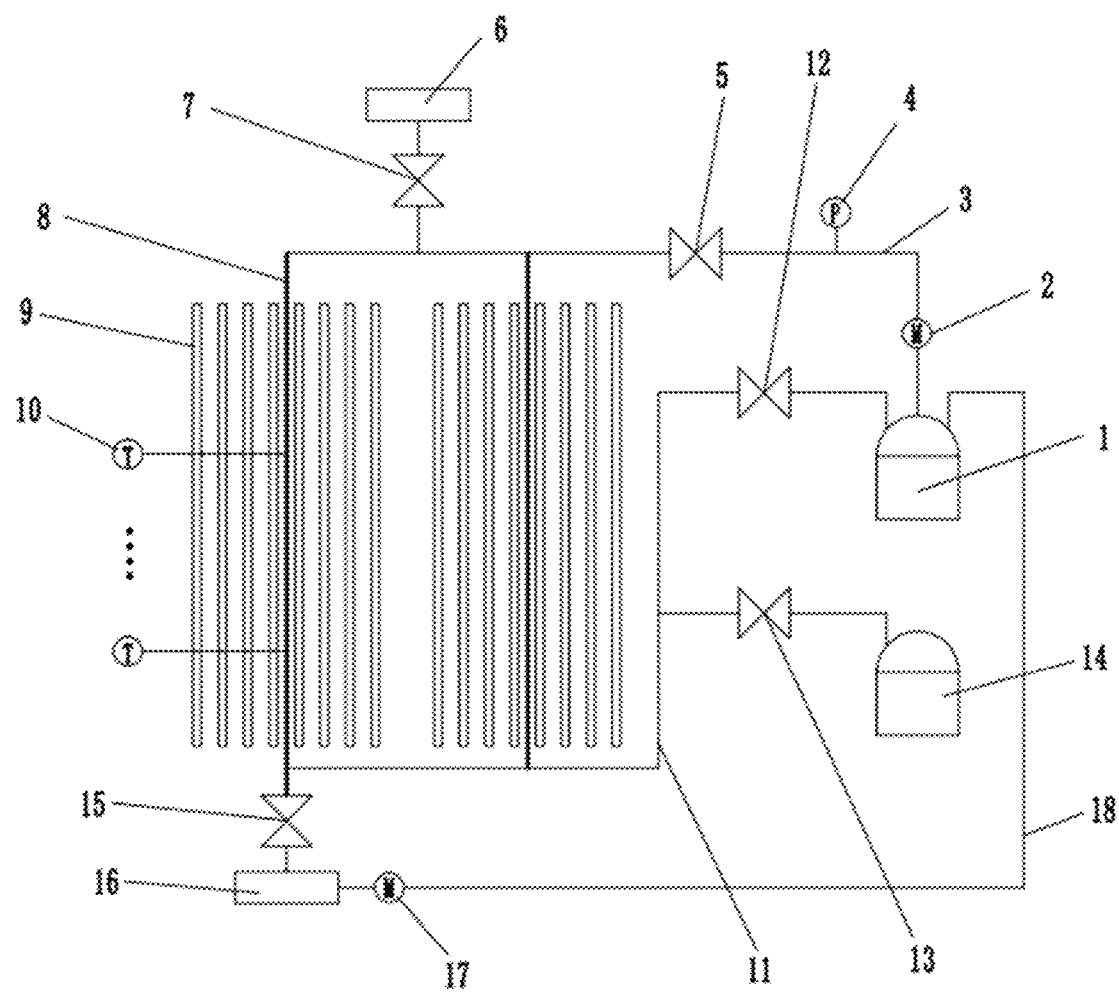
FIG. 1 is a schematic diagram of an integral structure and a normal heat collection loop of a line-focusing heat collection system according to some embodiments of the present disclosure.

As shown in FIG. 1 to FIG. 7, the present disclosure provides a low-heat-loss operation method of a line-focusing heat collection system. The line-focusing heat collection system includes a heat collection loop and a heat collection device 9 for carrying out focusing heating on collector tubes 8 in the heat collection loop. The heat collection device 9 is used for converting light energy of solar light into heat energy, and can be a linear Fresnel heat collector or a trough collector. A heat transfer working medium can be water, heat conduction oil, fused salt or the like. As shown in FIG. 1, an inlet of the collector tube 8 in the heat collection device 9 is connected with a low-temperature tank 1 through a cold working medium common tube 3 and a circulating pump 2 and an outlet of the collector tube 8 is connected with a high-temperature tank 14 through a hot working medium common tube 11 and a second return valve 13 to form the heat collection loop for circulating. The method includes the following steps.

In step 100, before the heat transfer working medium is injected, the collector tubes 8 are preheated in an empty tube state by utilizing solar energy. The purpose of preheating the collector tubes 8 is to prevent the heat transfer working medium from being cooled and solidified after the heat transfer working medium is injected into the collector tubes 8, so that the efficiency of injecting the heat transfer working medium is improved, and the freezing and blocking problem of the collector tube 8 is avoided. Solar energy is used during preheating, so that clean energy can be effectively utilized, and the loss of fossil energy is reduced. During preheating, the heat collection device 9 is in a preheating mode, which means that the heat generated by solar illumination is utilized to heat the collector tube 8 and keep the collector tube 8 warm. The heat collection energy in the preheating mode is less than the heat collection energy in a focusing mode. Preheating can be realized by intermittent focusing. When a linear Fresnel heat collection structure is adopted, some primary mirrors 91 can always be in a working state (which can transmit solar rays 93 to the collector tube 8) and other primary mirrors 91 are in a non-working state.

In step 110, after the collector tube 8 reaches a set preheating temperature (the set preheating temperature is different for different heat transfer working mediums, which can be determined by experiments and can reach a condensation prevention temperature point of the heat transfer working medium), the circulating pump 2 is switched on to inject the heat transfer working medium into the collector tube 8 and start circulation of the heat transfer working medium, and the heat collection device 9 is converted into the focusing mode from the preheating mode. The focusing mode means that the solar rays 93 can irradiate the collector tube 8 to heat the tube wall of the collector tube 8. At the same time, heat is transferred to the heat transfer working medium in the collector tube 8, so that the heat transfer working medium is kept in a fused (liquid) state which is convenient for flowing. When a linear Fresnel structure is adopted, the primary mirrors 91 reflect the solar rays 93 to a secondary mirror 92 or directly reflects the solar rays to the tube wall of the collector tube 8, and then the secondary mirror 92 focuses the solar rays 93 on the tube wall of the collector tube 8, thus achieving uniform heating of the collector tube 8 in the circumferential direction.

Figure 3:
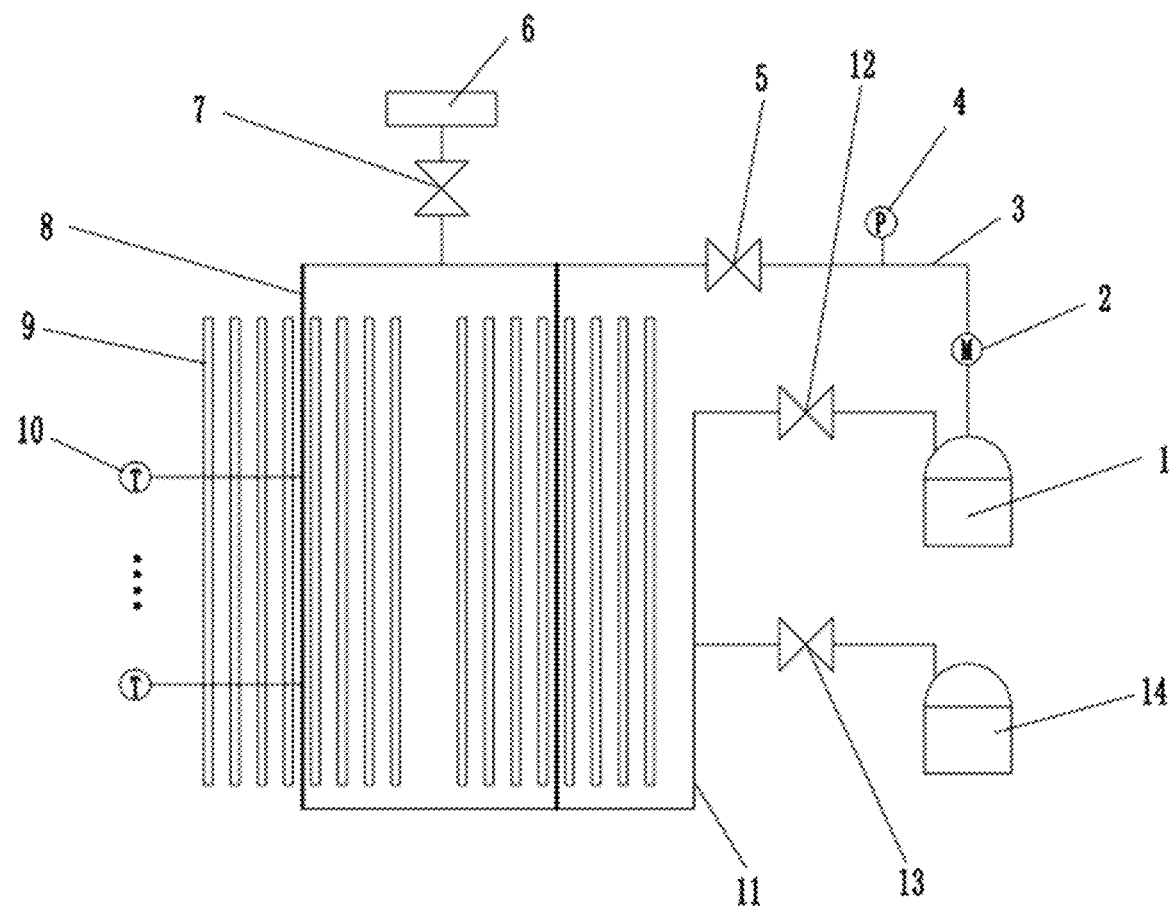
FIG. 3 is a schematic diagram of an injection loop of a heat transfer working medium according to some embodiments of the present disclosure.

When the heat transfer working medium is injected into the collector tube 8, the circulating pump 2 is switched on to inject the low-temperature heat transfer working medium in a low-temperature tank 1 into the collector tube 8 through the cold working medium common tube 3. When the heat transfer working medium flows through the collector tube 8, the position of the heat transfer working medium is judged by temperature measuring points 10 distributed on the collector tube 8, and the heat collection device 9 is gradually converted into the focusing mode from the preheating mode. That is, an injection section of the collector tube 8 is converted into the focusing mode from the preheating mode. Therefore, the conversion of the focusing mode can be carried out in sections on the collector tube 8, which is determined according to the position of the heat transfer working medium in the collector tube 8 obtained by monitoring. Specifically, multiple independently controlled tracing mechanisms are arranged in each heat collection loop (corresponding to the collector tube 8). By controlling the preheating mode of each of the tracing mechanisms, the temperature rise speed of a corresponding section of the collector tube 8 in the heat collection loop can be controlled. When overtemperature or low temperature occurs in a certain section of the collector tube 8 in the heat collection loop, the time proportion of focusing to defocusing on the certain section of the collector tube 8 can be adjusted by independently controlling the corresponding tracing mechanism of the certain section. That is, the proportion of a focusing state to a defocusing state of the tracing mechanism is increased or decreased, so that the temperature rise speed of the collector tube 8 is accurately adjusted. Through the operation method, on one hand, the injected heat transfer working medium can be heated in time to avoid energy waste of the solar rays 93; on the other hand, damage caused by continuous high-temperature heating of the collector tube 8 in the focusing mode can be avoided, and bending deformation caused by uneven heating of the collector tube 8 can also be avoided. As shown in FIG. 3, when the outlet temperature of the heat collection system does not reach a rated heat collection temperature, the heat transfer working medium is introduced into the low-temperature tank 1 through the first return valve 12. When the outlet temperature of the heat collection system reaches the rated heat collection temperature, the heat transfer working medium is introduced into a high-temperature tank 14 through the second return valve 13.

In step 120, when the heat transfer working medium is drained at the end of heat collection, the circulating pump 2 in the line-focusing heat collection system is switched off to stop the circulation of the heat transfer working medium in the system, and the original heat collection device 9 still keeps the heat collection state for the collector tube 8. That is, the focusing mode is still carried out. When the linear Fresnel structure is adopted, the collector tube 8 is heated uniformly in the circumferential direction.

In step 130, the drainage valve 15 is opened, and the heat transfer working medium is drained into a storage tank from the collector tube 8; and when the heat transfer working medium is drained, an emptying section of each of the collector tubes 8 is converted into a light heat-tracing mode from the focusing mode. The storage tank can be a drainage tank 16 or a low-temperature tank 1. The heat transfer working medium can be drained by a drive of a pump, a flow of the heat transfer working medium by its own weight or an assist of the compressed gas. When the heat transfer working medium flows out for a certain distance, in order to avoid negative pressure in the emptying section of the collector tube 8 caused by the outflow of the heat transfer working medium, it is necessary to open a compressed gas valve 7 to replenish gas (air or nitrogen, and so on) to the empty tube part (emptying section) of the collector tube 8. And, when the heat transfer working medium in a certain section of the collector tube 8 has been emptied, the mirror field in the heat collection device 9 is converted into a light heat-tracing mode from the focusing mode, so that a condenser can be switched between the focusing state and the defocusing state. By adjusting the time proportion of the focusing state to the defocusing state, the temperature of the collector tube 8 in the light heat-tracing mode is controlled, and the temperature of the collector tube 8 is continuously preserved, so that the heat transfer working medium remaining on the tube wall of the collector tube 8 is emptied. In the drainage process of the heat transfer working medium, the emptying section of the collector tube 8 is converted into the light heat-tracing mode from the focusing mode, and the temperature of the collector tube 8 is continuously preserved, so that the heat in the focusing mode is avoided from damaging the collector tube 8. The conversion of the focusing mode can be carried out in sections on the collector tube 8, which is determined according to the position state of the heat transfer working medium in the collector tube 8 obtained by monitoring. The light heat-tracing mode mentioned here refers to that the heat generated by solar illumination is utilized to heat the collector tube 8 and keep the collector tube 8 warm. The heat collection energy in the light heat-tracing mode is less than the heat collection energy in the focusing mode. Light heat tracing can be realized by intermittent focusing, or by the way that some primary mirrors 91 are always in a working state (which can transmit solar rays 93 to the collector tube 8) other primary mirrors 91 are in a non-working state. Therefore, when the heat transfer working medium is discharged from the heat collection system, a slow preheating mode or a quick preheating mode should be adopted according to the temperature of a branch pipe, and the position where the heat transfer working medium flows back should be switched to a preparation state or a defocusing state in time. The heat transfer working medium discharging from the heat collection system flows back to the low-temperature tank 1 or the high-temperature tank 14 by means of its own weight, or is pumped back to the low-temperature tank 1 through the drainage valve 15, the drainage tank 16 and a salt drainage pipeline.

In step 140, after the heat transfer working medium in the collector tube 8 is emptied, there is no heat transfer working medium in the collector tube 8, and the light heat-tracing mode of the collector tube 8 is stopped. So, the drainage process of the heat transfer working medium is finished. In the injection process of the heat transfer working medium, the injection section of the collector tube 8 is converted into the focusing mode from the preheating mode. In the drainage process of the heat transfer working medium, the emptying section of the collector tube 8 is converted into the light heat-tracing mode from the focusing mode. That is, with different heating modes of the heat transfer working medium in different stages of injection, heat collection and drainage, solar energy can be effectively utilized to assist in achieving daily operation of injection and discharge of the heat transfer working medium, the risk that the heat transfer working medium is frozen and blocked in a non-heat-collection state is avoided, and heat loss consumption generated by low-speed circulation condensation prevention and derived circulation power consumption are reduced.

Figure 2:
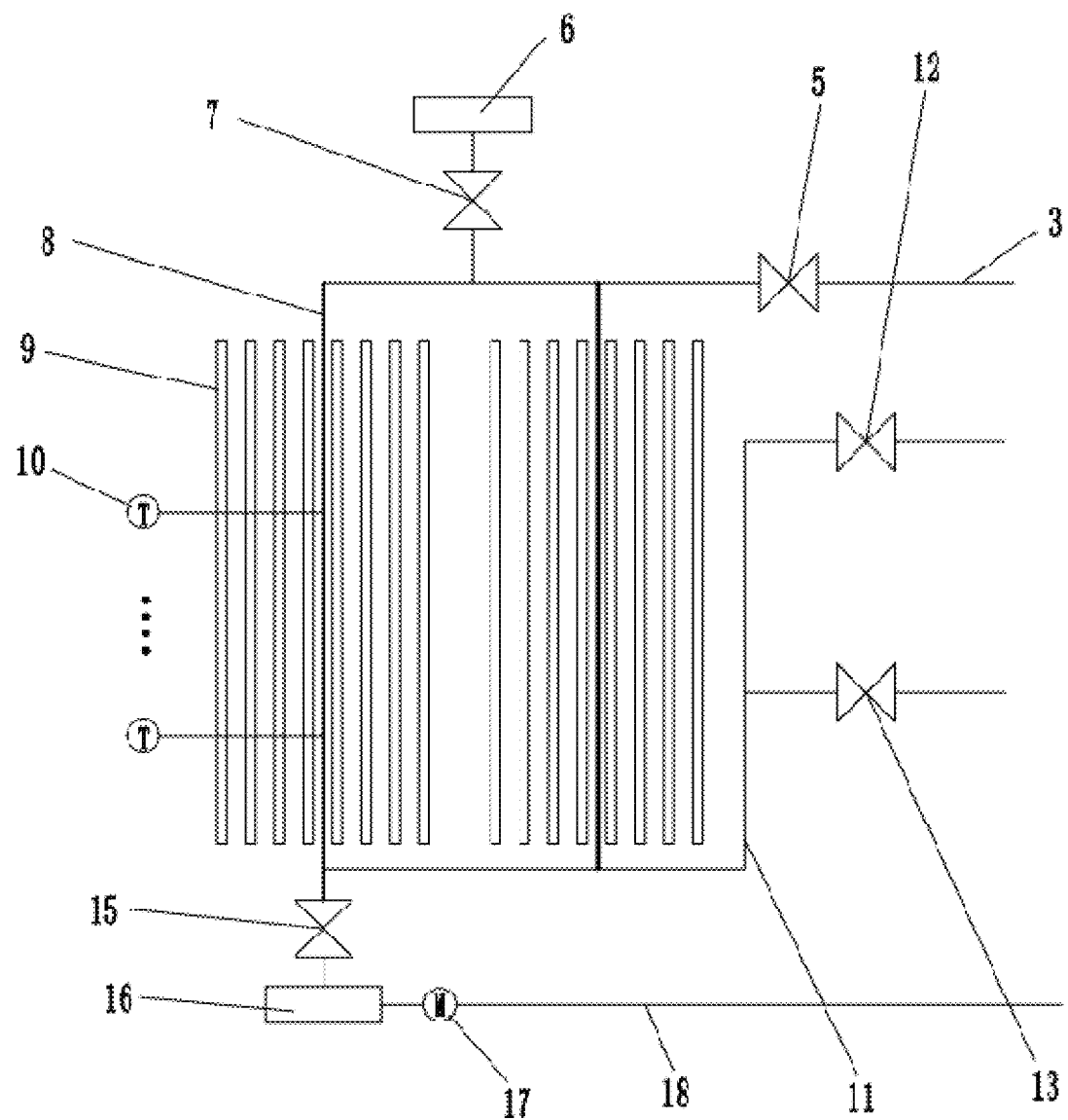
FIG. 2 is a schematic diagram of a preheating loop according to some embodiments of the present disclosure.

Further, as shown in FIG. 2, when the collector tube 8 is preheated, compressed gas is supplied into the collector tube 8 to realize homogenization of the tube wall temperature. Specifically, the compressed gas source 6 is switched on, and the compressed gas (which can be compressed air or compressed nitrogen or the like) is supplied into the collector tube 8. When the compressed gas passes through the collector tube 8, the temperature of the compressed gas can be raised, and the high-temperature compressed gas can drive heat transfer during the flowing process of the high-temperature compressed gas, thus enhancing the heat exchange between the local high-temperature position and the local low-temperature position of the collector tube 8, and improving the heat conductivity. Finally, the compressed gas is discharged to the atmosphere through the drainage tank 16 to form a preheating loop, so that the tube wall temperature of the collector tube 8 can be homogenized by the compressed gas. After the set preheating temperature is reached, the compressed gas source 6 is switched off. The temperature uniformity can be detected by the temperature measuring points 10 distributed on the collector tube 8. According to the difference of the temperatures of the collector tube 8 during preheating, the compressed gas with different pressures can be used to force the gas in the collector tube 8 to flow. For example, a higher pressure is used when the temperature is higher, and a lower pressure is used when the temperature is lower. The compressed air system and the drainage system can be selected according to the engineering practice of the line-focusing heat collecting system, and the low heat loss operation method can include all processes above or the combination of some processes thereof.

Figure 4:
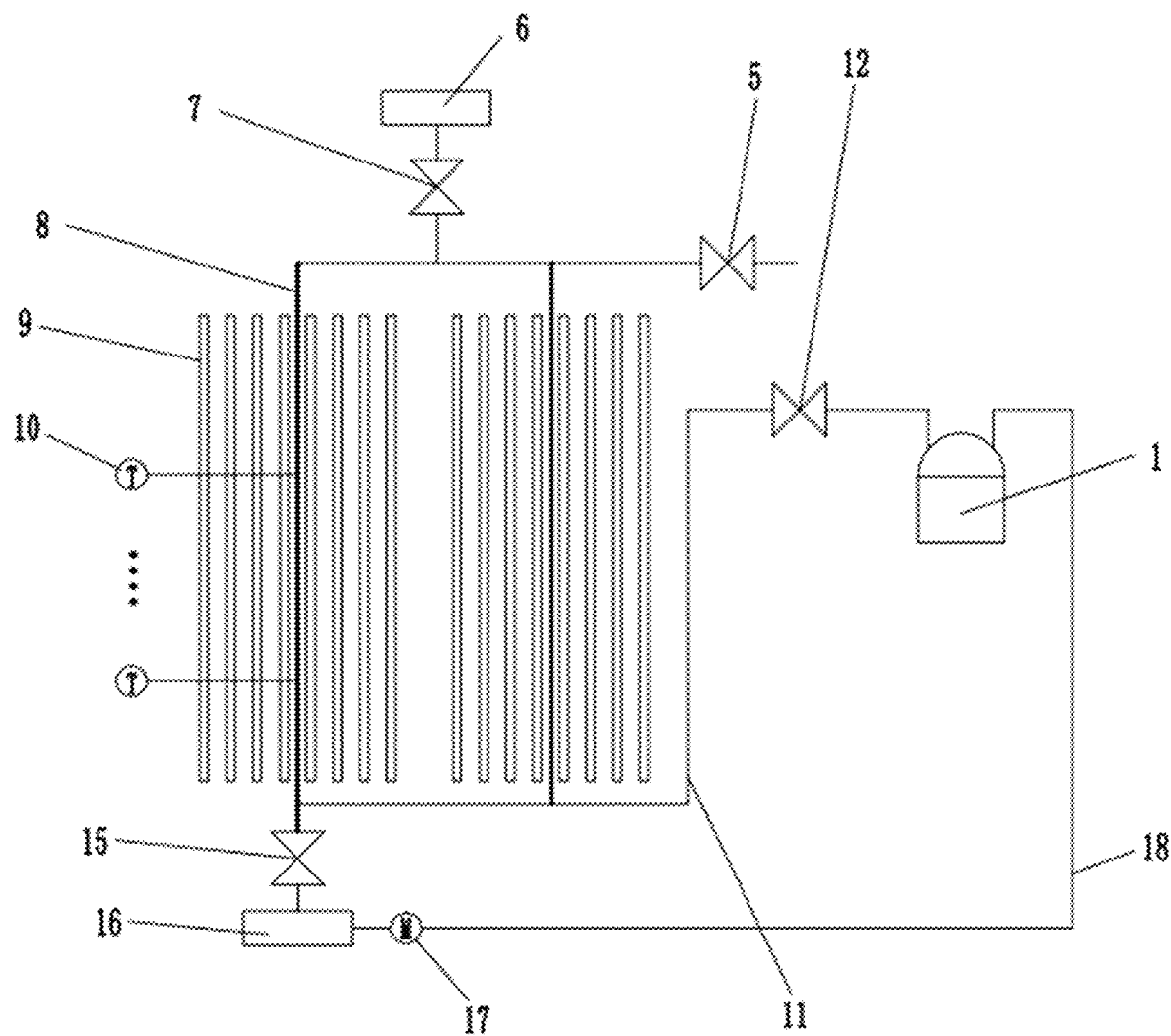
FIG. 4 is a schematic diagram of a drainage loop of the heat transfer working medium according to some embodiments of the present disclosure.

As shown in FIG. 1 o FIG. 4, multiple temperature measuring points 10 can be distributed on the collector tube 8 along the length direction thereof. Each temperature measuring point 10 can monitor the temperature value and the variation form of the corresponding position. Because of the difference of the temperatures of the collector tube 8 at the positions with the heat transfer working medium or without the heat transfer working medium, the position of the heat transfer working medium can be judged according to the monitoring results of the temperature measuring points 10. Furthermore, according to the monitoring results of the temperature measuring point 10, the specific injection state and the drainage state of the collector tube 8 are judged, and the heating mode of different positions of the collector tube 8 is changed accordingly, thus providing a basis for the change of the heat collection state in a certain section on the collector tube 8. In the preheating mode, the position of the heat transfer working medium in the heat collection loop can be judged according to the flow speed of the heat transfer working medium and the change of the temperature measuring points 10 in the collector tube 8. When the heat transfer working medium passes through the corresponding temperature measuring point 10, a condenser in front of the temperature measuring point 10 changes from the preheating mode to the focusing mode until the heat transfer working medium passes through the last temperature measuring point 10, and the whole heat collection system loop is completely in transition to the focusing heat collection operation mode. At this time, the collector tube 8 is in the focusing state as a whole. The collector tube 8 is focused and heated, and the energy of the solar rays 93 is continuously converted into the energy of the heat transfer working medium circulating in the collector tube 8.

The supply pressure and the supply frequency of the compressed gas can be adjusted according to the monitored temperature value of the temperature measuring point 10, and the monitored temperature value is proportional to the supply pressure and the supply frequency of the compressed gas. When the temperature of the temperature measuring point is low, a lower supply pressure is used, and the use frequency is also correspondingly reduced. When the temperature of the temperature measuring point is high, a higher supply pressure is used, and the use frequency is increased. So, the temperature rise of each temperature measuring point in the collector tube 8 is consistent.

Because the heat collection power of the heat collection device 9 is related to the season, time, irradiance, location and other factors, in order to realize the controllable preheating mode, the collector tubes 8 in the empty tube states are preheated to the set temperature point according to the set temperature rise rate. The preheating mode may include a preheating preparation state, a focusing state and a defocusing state. In the preheating preparation state, the solar rays 93 are ready to be focused on the collector tube 8, but have not yet reached the collector tube 8, and the collector tube 8 is not heated at this time. In the focusing state, the solar rays 93 can be finally focused on the collector tube 8, and the collector tube 8 is heated at this time. In the defocusing state, the solar rays 93 cannot be focused on the collector tube 8, and the collector tube 8 is not heated at this time. By adjusting the time proportion of the preheating preparation state, the focusing state to the defocusing state, the heating time of the collector tube 8 can be adjusted, and intermittent heating is realized, so that the collector tube 8 in the preheating mode can be controlled to be in different preheating modes at different heat collection powers and be heated at a set temperature rise rate. So, the collector tube 8 can be heated to a set temperature point at a controlled temperature rise rate, and the heat transfer working medium can be safely injected.

The light heat-tracing mode may include a focusing state and a defocusing state. In the focusing state, the solar rays 93 can be finally focused on the collector tube 8, and the collector tube 8 is heated at this time. In the defocusing state, the solar rays 93 cannot be focused on the collector tube 8, and the collector tube 8 is not heated at this time. By adjusting the time proportion of the focusing state to the defocusing state, the heating time of the collector tube 8 can be adjusted, and intermittent heating is realized. Thus, the temperature of the collector tube 8 in the light heat-tracing mode can be controlled to be within an appropriate range. In the temperature range, the collector tube 8 is prevented from being damaged by too high temperature, the heat transfer working medium is prevented from being solidified by too low temperature, and finally thorough drainage of the heat transfer working medium can be ensured.

In the drainage process of the heat transfer working medium, if the collector tube 8 is arranged obliquely, the heat transfer working medium can be drained by the own-weight flow of the heat transfer working medium. And, the flow of the heat transfer working medium can be assisted by the power of the compressed gas. Especially, when the collector tube 8 is free of inclination, the heat transfer working medium cannot flow by itself. At this time, the compressed gas can provide main power to drive the heat transfer working medium to be drained, so that the drainage efficiency of the heat transfer working medium can be further improved by using the compressed gas. Moreover, the residual quantity of the heat transfer working medium in the collector tube 8 can also be further reduced by using the scouring capability of the compressed gas. In addition, when the compressed gas is used to provide power, according to the flow state or demand of the heat transfer working medium in the collector tube 8, the compressed gas with different pressures can be used to assist in quickly emptying the heat transfer working medium. The pressure of the compressed gas is mainly determined by two factors. One factor is the slope of the collector tube 8. The greater the slope, the quicker the own-weight backflow is, and the smaller the required pressure is. The smaller the slope, the slower the own-weight backflow is, and the greater the required pressure is. The other factor is that when the slope is a certain value, if it is necessary to speed up the emptying speed or be drained more thoroughly, the pressure of the compressed gas can be increased. As shown in FIG. 4, when the low-temperature heat storage position is low, the heat transfer working medium can directly flow back to the low-temperature tank 1 through the hot working medium common tube 11 and the first return valve 12. When direct confluence cannot be realized, the heat transfer working medium can be transferred through the drainage valve 15 and the drainage tank 16, and then pumped back to the low-temperature tank 1 through the drainage pump 17 and the drainage pipeline 18.

As shown in FIG. 1 to FIG. 7, the present disclosure also provides a line-focusing heat collection system. The line-focusing heat collection system includes a collector tube 8, a low-temperature tank 1 and a high-temperature tank 14 which respectively communicates with a heat collection inlet and a heat collection outlet of the collector tube 8, and the heat transfer working medium for circulating. The low-temperature tank 1 communicates with the collector tube 8 through the cold working medium common tube 3, and the high-temperature tank 14 communicates with the collector tube 8 through the hot working medium common tube 11. Pressure measuring points 4 and a heat collection inlet valve 5 can also be arranged on the cold working medium common tube 3, so that the pressure state of the pipeline can be monitored by using the pressure measuring points 4, and a circulating pump 2 or the pipeline can be prevented from being damaged by high pressure due to pipeline blockage and other problems. The collector tubes 8 are matched with a heat collection device 9. The heat collection device 9 is used for focusing and collecting heat on the collector tubes 8. The low-temperature tank 1 is used for storing the heat transfer working medium with relatively low temperature. The high-temperature tank 14 is used for storing the heat transfer working medium with relatively high temperature (absorbing the heat of the solar energy). Under the driving of the circulating pump 2, the heat transfer working medium flows out of the low-temperature tank 1, absorbs heat through the collector tube 8, and then flows to the high-temperature tank 14. The heat collection outlet also communicates with the drainage tank 16. The drainage tank 16 is used for temporarily storing the heat transfer working medium when the line-focusing heat collection system needs drainage work. The heat collection device 9 includes multiple tracing mechanisms. Each of tracking mechanisms corresponds to a section of the collector tube 8, that is, the collector tube 8 is matched with corresponding tracing mechanisms in sections. By controlling the tracing mechanism, the reflection angles of primary mirrors 91 can be changed, so that the state whether the solar rays 93 are reflected to a secondary mirror 92 (or the collector tube 8) or not can be changed, and then the conversion of the heat collection mode (switching between the focusing mode and the defocusing mode) can be realized. By controlling the tracing mechanisms, in the injection process of the heat transfer working medium, an injection section of the collector tube 8 is converted into a focusing mode from a preheating mode. In the drainage process of the heat transfer working medium, an emptying section of the collector tube 8 is converted into a light heat-tracing mode from a focusing mode.

Further, the heat collection inlet can further communicate with a compressed gas source 6 for supplying compressed gas (specifically, compressed air, nitrogen, and so on) to the collector tube 8. Whether the compressed gas source 6 supplies the compressed gas to the collector tube 8 or not is controlled by the compressed gas valve 7. The feeding position of the compressed gas and the injection position of the heat transfer working medium may be located on the same side of the collector tube 8. After the collector tube 8 is preheated by the compressed gas, the tube wall temperature of the collector tube 8 is homogenized, and the heat transfer working medium is injected into the collector tube 8 in time.

A drainage valve 15 is arranged between the drainage tank 16 and the collector tube 8. That the system is in a heat collection working state or enters into a drainage working state is adjusted by controlling the opening and the closing of the drainage valve 15. It should be noted that, before the heat transfer working medium is injected, since the collector tube 8 is in an empty tube state, a compressed gas passage can be formed by opening the drainage valve 15 at this time, so that a preheating loop is formed. During the drainage operation, the drainage tank 16 communicates with the low-temperature tank 1 through a drainage pump 17 and a drainage pipeline 18, and the heat transfer working medium temporarily stored in the drainage tank 16 can be transported into the low-temperature tank 1 under the power of the drainage pump 17. The low-temperature tank 1 may be provided with a heat preservation and heating device, so that the low-temperature tank 1 can be kept in a certain temperature range all the time. When normal heat collection operation is required, the heat transfer working medium in the low-temperature tank 1 can be injected into the collector tube 8 again through the circulating pump 2 and circulated.

The heat collection device 9 includes multiple tracing mechanisms. Each of the tracking mechanisms corresponds to a section of the collector tube 8, that is, the collector tube 8 is matched with corresponding tracing mechanisms in sections. By controlling the tracing mechanism, the reflection angles of the primary reflectors 91 can be changed, so that the state whether the solar rays 93 are reflected to the secondary reflector 92 (or the collector tube 8) or not can be changed, and then the conversion of the heat collection mode (switching between the focusing mode and the defocusing mode) can be realized. In the injection process of the heat transfer working medium, the injection section of the collector tube 8 is successfully converted into the focusing mode from the preheating mode.

The heat collection outlet can be connected with the low-temperature tank 1 and the high-temperature tank 14 through pipelines, and a first return valve 12 is arranged near the low-temperature tank 1, and a second return valve 13 is arranged near the high-temperature tank 14. The heat transfer working medium in the collector tube 8 can flow back to the drainage tank 16, the low-temperature tank 1 or the high-temperature tank 14, which can be selected according to the temperature of the heat transfer working medium. For example, if the temperature of the heat transfer working medium is high and meets the conditions for entering the high-temperature tank 14, the heat transfer working medium can directly flow back to the high-temperature tank 14. When the temperature is low, the heat transfer working medium can flow back to the low-temperature tank 1. The selection of each tank and the flow direction of the heat transfer working medium are controlled by the drainage valve 15, the first return valve 12 and the second return valve 13 respectively.

Figure 5:
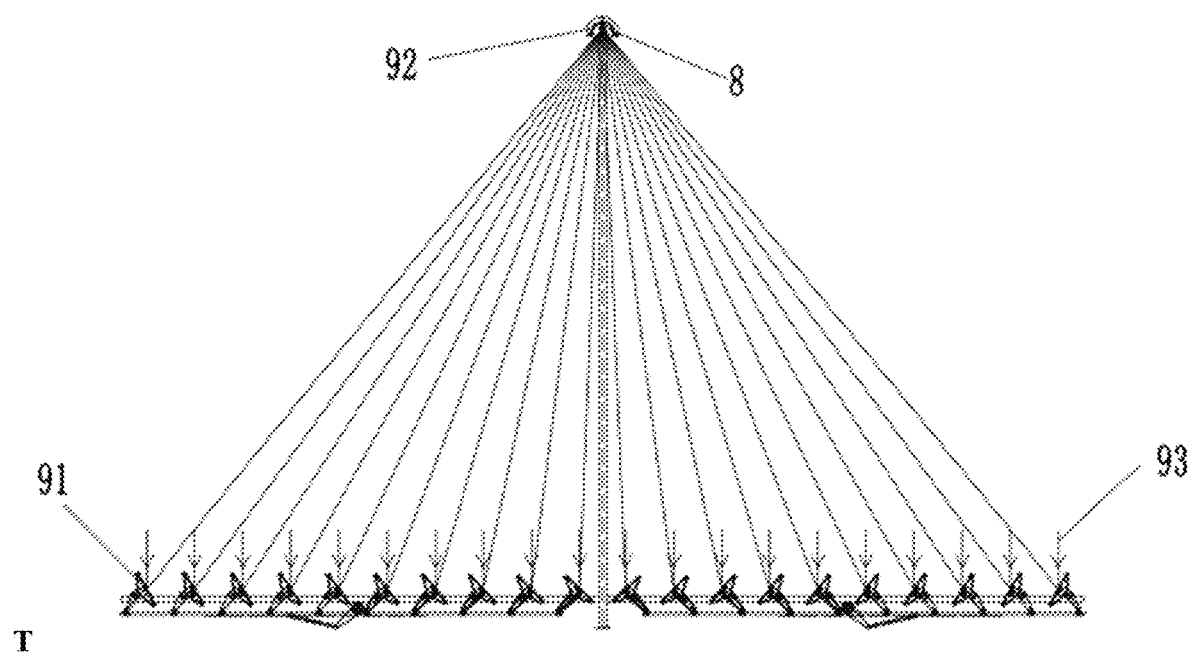
FIG. 5 is a structural schematic diagram of a heat collection device according to some embodiments of the present disclosure.
Figure 6:
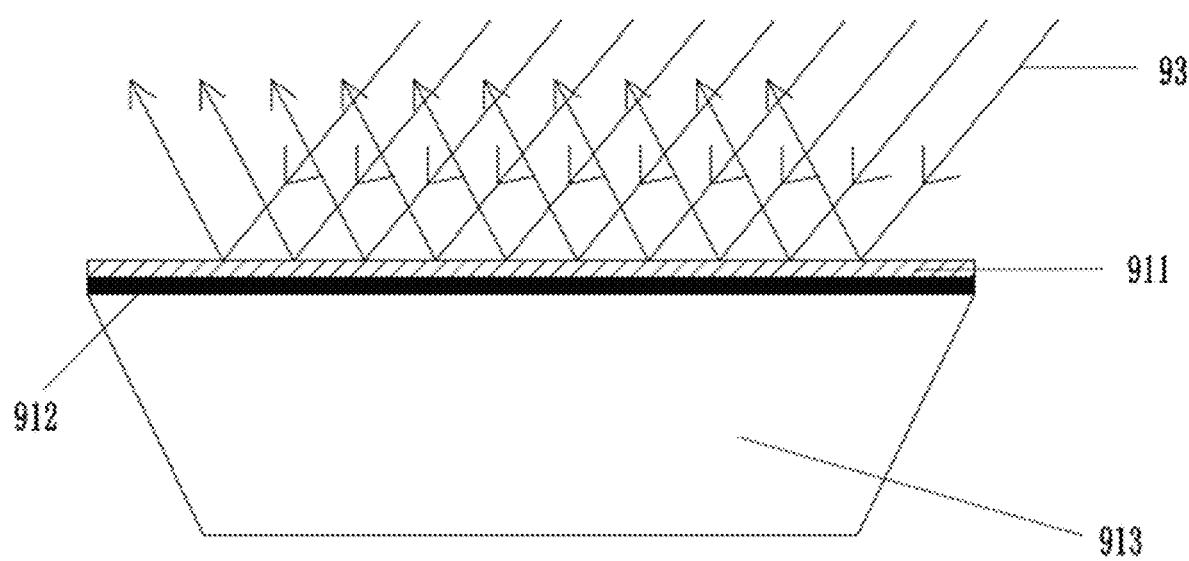
FIG. 6 is a structural schematic diagram of a primary mirror in FIG. 5.
Figure 7:
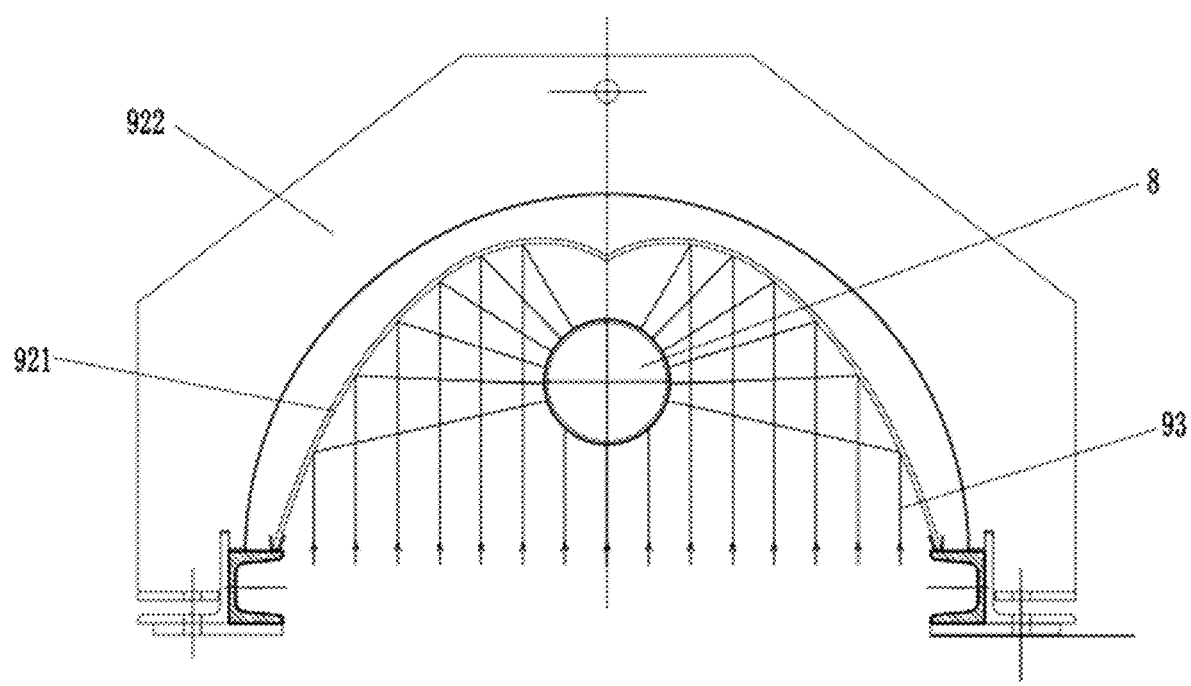
FIG. 7 is a structural schematic diagram of a secondary mirror in FIG. 5.

The heat collection device 9 can be a linear Fresnel structure or a trough structure, including mirrors. The mirrors are controlled by tracing mechanisms. The collector tube 8 is controlled to be in a preheating preparation state, a focusing state or a defocusing state by changing whether the mirrors are focused on the collector tube 8. When the heat collector 9 is a linear Fresnel structure, as shown in FIG. 5 to FIG. 7, the mirrors include the primary mirrors 91 and the secondary mirror 92. The primary mirrors 91 have a much larger laying area than the secondary mirror 92. The secondary mirror 92 is curved around and buckled on the outer circumference of the collector tube 8. The primary mirrors 91 can collect the solar rays 93 to the secondary mirror 92, and then the secondary mirror 92 can focus the solar rays 93 on the collector tube 8, so that the collector tube 8 can be focused and heated at various positions in the circumferential direction. Meanwhile, the solar rays 93 reflected by some primary mirrors 91 can be directly focused on the collector tube 8 without being reflected by the secondary mirror 92. The primary mirrors 91 are controlled by the tracing mechanisms and correspond to different area sections of the secondary mirror 92, so that different positions of the collector tube 8 can be focused. Whether the primary mirrors 91 focus the solar rays 93 to the secondary mirror 92 or not is controlled by the tracing mechanisms, so that the collector tube 8 can be controlled to be in a preheating preparation state, a focusing state, or a defocusing state.

The present disclosure also provides the following specific embodiments.

Embodiment I

The step of injecting the heat transfer working medium into the heat collection system includes preheating and heating the collector tube 8 of the heat collection system in an empty tube state by focusing solar rays. Linear Fresnel type is adopted in the preheating process. There are mainly two preheating manners.

The first preheating manner is completed in the sunny morning. Before the sun rises from the horizontal plane, the primary mirrors 91 of the mirror field are turned to be in the preparation mode. The difference between the angles of the primary mirrors 91 in the preparation mode and the focusing angle are 2 degrees, and the 2-degree difference between the angles of the primary mirrors and the focusing angle are kept all the time in the preparation mode. After the sun is exposed from the horizontal plane, the mode is switched to the quick preheating mode, so that light resources with the solar elevation angle of less than 15 degrees can be used for heating the collector tube 8. When the solar elevation angle is small, the primary mirrors 91 are seriously shielded from each other because of structural reasons, and the direct solar radiation in the morning is not high, so the quick preheating method can be used to improve the heating speed. In the quick preheating mode, each primary mirror 91 rotates by 2 degrees from the angle of the preparation position to reach the focusing angle, and rotates back by 2 degrees after focusing for 15 seconds. Each primary mirror 91 rotates by 2 degrees first, then stays for 15 seconds and then rotates back by 2 degrees, In this way, the primary mirrors 91 rotates back and forth for preheating. In the preheating process, because of the secondary mirror 92, the collector tube 8 is heated evenly, and the collector tube 8 is prevented from being bent and damaged due to uneven heating. Six temperature measuring points are set in the whole single loop on average to monitor the temperature change in real time. When the temperature is low, compressed air is introduced every 10 minutes. When the temperature is raised, compressed air is introduced every 5 minutes. Both the introducing of the compressed air and the preheating are carried out at the same time, so that the whole pipeline is heated evenly. When the temperature of the collector tube 8 is preheated to a specified temperature, the primary mirrors 91 are automatically switched into the preparation mode from the quick preheating mode.

In the second preheating manner, the weather suddenly clears up, and the time point is no longer morning. In this case, the direct solar radiation is generally greater than 500 W/m$^2$, and the primary mirrors 91 are not shielded. At this time, the primary mirrors 91 on one side of the loop are used for preheating. The slow preheating mode is used for preheating, and the temperature of the collector tube 8 cannot rise too quickly to protect the stability of the collector tube 8 and the whole structure of the collector tube 8, the primary mirrors 91 as well as the second mirror 92. The slow preheating mode means that the angle of each primary mirror 91 continuously rotates within the range of +/−2 degrees with respect to the focusing angle. When the set preheating temperature is reached, the circulating pump 2 and the heat collection inlet valve 5 are started during the focusing and preheating process, and the heat transfer working medium is injected into the heat collection system to start circulating heat collection.

Embodiment II

The linear Fresnel focusing heat collection system includes primary mirrors 91, secondary mirrors 92, collector tubes 8, a steel structure support and a tracing driving system. As shown in FIG. 6, the primary mirror 91 includes a support box 913. The surface of the support box 913 is bonded with a primary mirror surface 911 through glue points 912. The support box 913 can drive the deflection angle of the primary mirror surface 911 under the action of the driving structure, and then the reflection direction of the solar rays 93 is adjusted. As shown in FIG. 7, the secondary mirror 92 includes a support frame 922 and a secondary mirror surface 921 fixedly mounted on the support frame 922. The secondary mirror surface 921 is arranged around the outer peripheral side of the collector tube 8. The secondary mirror surface 921 may be in the form of a curved surface such as a hyperboloid, and can reflect the solar rays 93 onto the collector tube 8, multiple primary mirror surfaces 911, which may be planar mirrors, are symmetrically arranged below the secondary mirror 92 and driven by two sets of independent motors. By adjusting the angle of the primary mirror surface 911, the solar rays 93 irradiated on the primary mirror surfaces 911 can be reflected to the secondary mirror surface 921, and reach the surface of the collector tube 8 through the reflection one or multiple times, so that the energy loss is less, and the obliquely incident sunlight can be effectively collected. The secondary mirror surface 921 may be of a curved structure. For example, the secondary mirror surface 921 is composed of an involute and a parabola of a circle and symmetrical with respect to the central axis. The secondary mirror surface 921 reflects the solar rays 93 reflected by the primary mirror surfaces 911 onto the collector tube 8 mounted on the focal line of the secondary mirror 92. Since the area of the primary mirror surfaces 911 is larger than that of the secondary mirror surface 921, a wider range of solar energy can be obtained by a larger area of illumination. By uniformly distributing the primary mirror surfaces 911 and the secondary mirror surface 921 along the longitudinal direction of the collector tube 8, the collector tube 8 can be heated evenly, and effective utilization of solar energy for fused salt in the collector tube 8 can be realized.

When heat is collected, the primary mirrors 91 trace the sun in two dimensions in real time under the driving of a tracing control device. The incident sunlight is converged to the collector tube 8 fixedly mounted in the secondary mirror 92, so that the collector tube 8 can absorb the converged solar radiation energy. The absorbed solar radiation energy can be used to heat the heat transfer working medium in the collector tube 8. When the collector tube 8 is in the preheating mode and heat-tracing mode, the rotating angles of the primary reflectors 91 can be controlled by a driving mechanism, so that the reflected solar rays 93 can be switched between the preparation state and the focusing state. The temperature of the collector tube 8 can be controlled by adjusting the time proportion of the preparation state to the focusing state.

Embodiment III

The heat transfer working medium is binary fused salt, and the low-temperature fused salt at 290° C. is stored in the low-temperature tank 1 to collect the heat for circulating. Firstly, the collector tube 8 is preheated by the heat collection device 9, and compressed air is filled in the collector tube 8 under the preheating process, so that the collector tube 8 in the empty tube state is heated evenly to 320° C. Then, the compressed air system and the drainage system are turned off. The circulating pump 2 is started to pump the low-temperature fused salt into the collector tube 8. The heat collection device 9 is switched into the focusing mode from the preheating mode. When the temperature of the fused salt at the outlet of the heat collection system is less than 420° C., the heated fused salt is sent into the low-temperature tank 1. When the temperature of the fused salt at the outlet of the heat collection system is greater than 420° C., the heated fused salt is sent to the high-temperature tank 14. When it is necessary to stop heat collection, the circulating pump 2 and the inlet valve 5 of the heat collection system are firstly turned off. The heat collection device 9 is switched into the heat-tracing mode from the focusing mode. The temperature of the heat collection pipe 8 maintains not lower than 320° C. The compressed air system and/or drain system are/is started, so that the heat transfer working medium flows back to the low-temperature tank 1 or is pumped into the low-temperature tank 1 by means of the drainage system.

Specific examples are used for illustration of the principles and implementation methods of the present disclosure. The description of the above-mentioned embodiments is used to help illustrate the method and its core principles of the present disclosure. In addition, those skilled in the art can make various modifications in terms of specific embodiments and scope of application in accordance with the teachings of the present disclosure. In conclusion, the content of this specification shall not be construed as a limitation to the present disclosure.

What is claimed is:

1. A low-heat-loss operation method of a line-focusing heat collection system, comprising the following steps:
    preheating collector tubes in an empty tube state by utilizing solar energy to enable the collector tubes to be in a preheating mode;
    after a set preheating temperature of each of the collector tubes is reached, injecting a heat transfer working medium into the collector tubes and starting a circulation of the heat transfer working medium, and when the heat transfer working medium is injected into the collector tubes, converting an injection section of each of the collector tubes into a focusing mode from the preheating mode;
    after heat collection of the collector tubes is finished, stopping the circulation of the heat transfer working medium, and keeping the focusing mode of the collector tubes;
    draining the heat transfer working medium into a storage tank through the collector tubes, and when the heat transfer working medium is drained, converting an emptying section of each of the collector tubes into a light heat-tracing mode from the focusing mode; wherein the light heat-tracing mode comprises a focusing state and a defocusing state, and a temperature of each of the collector tubes in the light heat-tracing mode is controlled by adjusting the time proportion of the focusing state to the defocusing state; and
    after the heat transfer working medium is emptied, stopping the light heat-tracing mode.

2. The low-heat-loss operation method of a line-focusing heat collection system according to any one of claim 1, wherein the preheating mode comprises a preheating preparation state, a focusing state and a defocusing state, and the line-focusing heat collection system is controlled to adopt a quick preheating mode or a slow preheating mode at different heat collection power by adjusting a time proportion of the focusing state to the defocusing state.

3. The low-heat-loss operation method of a line-focusing heat collection system according to claim 2, wherein when the heat transfer working medium is drained, the heat transfer working medium is drained to the storage tank by own weight of the heat transfer working medium and/or a power of the compressed gas.

4. The low-heat-loss operation method of a line-focusing heat collection system according to claim 1, wherein preheating the collector tubes comprises supplying compressed gas into the collector tubes to homogenize tube wall temperatures of the collector tubes by the compressed gas, and turning off the compressed gas after the set preheating temperature is reached.

5. The low-heat-loss operation method of a line-focusing heat collection system according to any one of claim 4, wherein the preheating mode comprises a preheating preparation state, a focusing state and a defocusing state, and the line-focusing heat collection system is controlled to adopt a quick preheating mode or a slow preheating mode at different heat collection power by adjusting a time proportion of the focusing state to the defocusing state.

6. The low-heat-loss operation method of a line-focusing heat collection system according to claim 5, wherein when the heat transfer working medium is drained, the heat transfer working medium is drained to the storage tank by own weight of the heat transfer working medium and/or a power of the compressed gas.

7. The low-heat-loss operation method of a line-focusing heat collection system according to claim 4, further comprising distributing a plurality of temperature measuring points on each of the collector tubes along a length direction thereof, and judging a injection state and a drainage state of the collector tube according to monitoring results of the plurality of temperature measuring points.

8. The low-heat-loss operation method of a line-focusing heat collection system according to any one of claim 7, wherein the preheating mode comprises a preheating preparation state, a focusing state and a defocusing state, and the line-focusing heat collection system is controlled to adopt a quick preheating mode or a slow preheating mode at different heat collection power by adjusting a time proportion of the focusing state to the defocusing state.

9. The low-heat-loss operation method of a line-focusing heat collection system according to claim 8, wherein when the heat transfer working medium is drained, the heat transfer working medium is drained to the storage tank by own weight of the heat transfer working medium and/or a power of the compressed gas.

10. The low-heat-loss operation method of a line-focusing heat collection system according to claim 7, further comprising adjusting a supply pressure and a supply frequency of the compressed gas according to temperature values of the plurality of temperature measuring points, wherein the temperature value is proportional to the supply pressure and the supply frequency of the compressed gas.

11. The low-heat-loss operation method of a line-focusing heat collection system according to any one of claim 10, wherein the preheating mode comprises a preheating preparation state, a focusing state and a defocusing state, and the line-focusing heat collection system is controlled to adopt a quick preheating mode or a slow preheating mode at different heat collection power by adjusting a time proportion of the focusing state to the defocusing state.

12. The low-heat-loss operation method of a line-focusing heat collection system according to claim 11, wherein when the heat transfer working medium is drained, the heat transfer working medium is drained to the storage tank by own weight of the heat transfer working medium and/or a power of the compressed gas.

13. A line-focusing heat collection system, comprising collector tubes, a low-temperature tank and a high-temperature tank which respectively communicates with a heat collection inlet and a heat collection outlet of each of the collector tubes, and a heat transfer working medium which is flowed circularly, wherein one drainage tank communicates with the heat collection outlet of each of the collector tubes, each of the collector tubes is matched with a plurality of tracing mechanisms, each of the plurality of the tracing mechanisms is corresponding to one section of the collector tube, an injection section of the collector tube is converted into a focusing mode from a preheating mode by controlling a corresponding one of the plurality of the tracing mechanisms when the heat transfer working medium is injected, and an emptying section of the collector tube is converted into a light heat-tracing mode from a focusing mode by controlling a corresponding one of the plurality of the tracing mechanisms when the heat transfer working medium is drained; wherein the light heat-tracing mode comprises a focusing state and a defocusing state, and a temperature of each of the collector tubes in the light heat-tracing mode is controlled by adjusting the time proportion of the focusing state to the defocusing state.

14. The line-focusing heat collection system according to claim 13, wherein the heat collection inlet communicates with a compressed gas source for supplying compressed gas to the collector tube.

15. The line-focusing heat collection system according to claim 13, further comprising mirrors, wherein each of the mirrors is controlled by a corresponding one of the plurality of the tracing mechanisms, and the collector tube is controlled to be in a preheating preparation state, a focusing state or a defocusing state in response to whether the mirrors focusing solar rays on the collector tube.

\* \* \* \* \*